United States Patent [19]

Einstein

[11] Patent Number: 4,627,585
[45] Date of Patent: Dec. 9, 1986

[54] PUSHER TYPE AUTO-PLANE

[76] Inventor: Harry Einstein, 25 Midvale Dr., Springfield, N.J. 07081

[21] Appl. No.: 624,521

[22] Filed: Jun. 25, 1984

[51] Int. Cl.⁴ .......................... B64C 3/56; B64C 37/00
[52] U.S. Cl. ........................................... 244/2; 244/49
[58] Field of Search ............................. 244/2, 49, 50

[56] References Cited

U.S. PATENT DOCUMENTS

| 1,393,820 | 10/1921 | Osborne | 244/49 |
| 1,731,757 | 10/1929 | Tubbe | 244/49 |
| 2,713,465 | 7/1955 | Novinger | 244/2 |
| 2,940,688 | 6/1960 | Bland | 244/2 |
| 3,065,927 | 11/1962 | Mills | 244/2 |
| 4,240,601 | 12/1980 | Reed | 244/49 |
| 4,269,374 | 5/1981 | Miller | 244/49 |

FOREIGN PATENT DOCUMENTS 635259  4/1950  United Kingdom .................. 244/49

OTHER PUBLICATIONS

Dewoitine, Published U.S. Ser. No. 323,201, May 25, 1943.
Scientific American, Mar. 1935, p. 151.

Primary Examiner—Galen L. Barefoot
Attorney, Agent, or Firm—Kenneth P. Glynn

[57] ABSTRACT

An improved auto-plane has been invented which has been adapted for air travel and road travel using a Pusher type design. The present invention auto-plane has two main wings which are cut approximately parallel to an imaginary fuselage centerline at about two-thirds the distance in from the wing's outer tip to the imaginary centerline, one of the two main wings being hinged along its cut and above its top surface at a height sufficient to allow both of the two wings to be folded inward 180° with one resting atop the other. The auto-plane includes a rear stabilizer system which can be retracted forward to reduce the overall length for road use, a Pusher type propeller, and a Pusher type aviation engine which is located within the fuselage to drive the propeller. Landing wheels are located on the underside of the fuselage in an aviation landing relationship, e.g. tricycle, and aviation controls are located within the fuselage to control the aviation engine, propeller and elevons and rudders. An independent land vehicle engine is located within the fuselage and connected to drive one or more of the wheels for land use. In an alternative embodiment, each wing is cut twice, once about one-quarter the distance in and once about three-quarters in, with hinges to allow unique double (spiral) folding to permit compact stocking of the twice folded wings.

8 Claims, 6 Drawing Figures

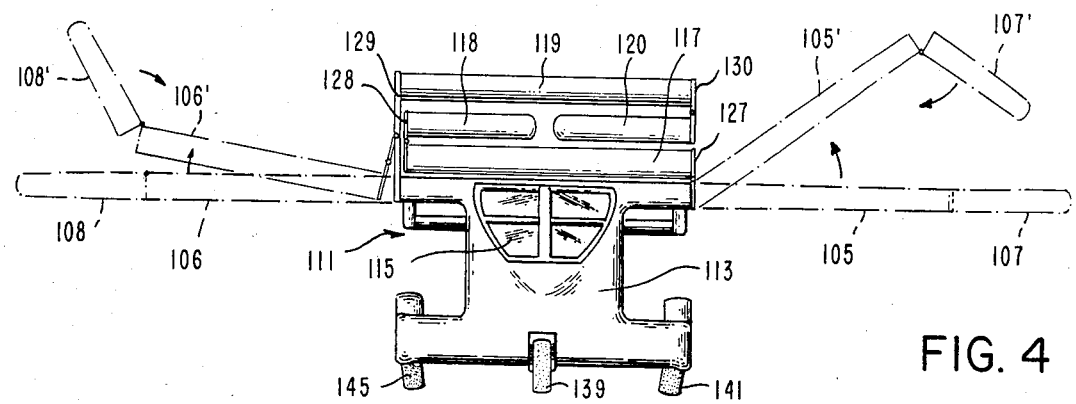
FIG. 4
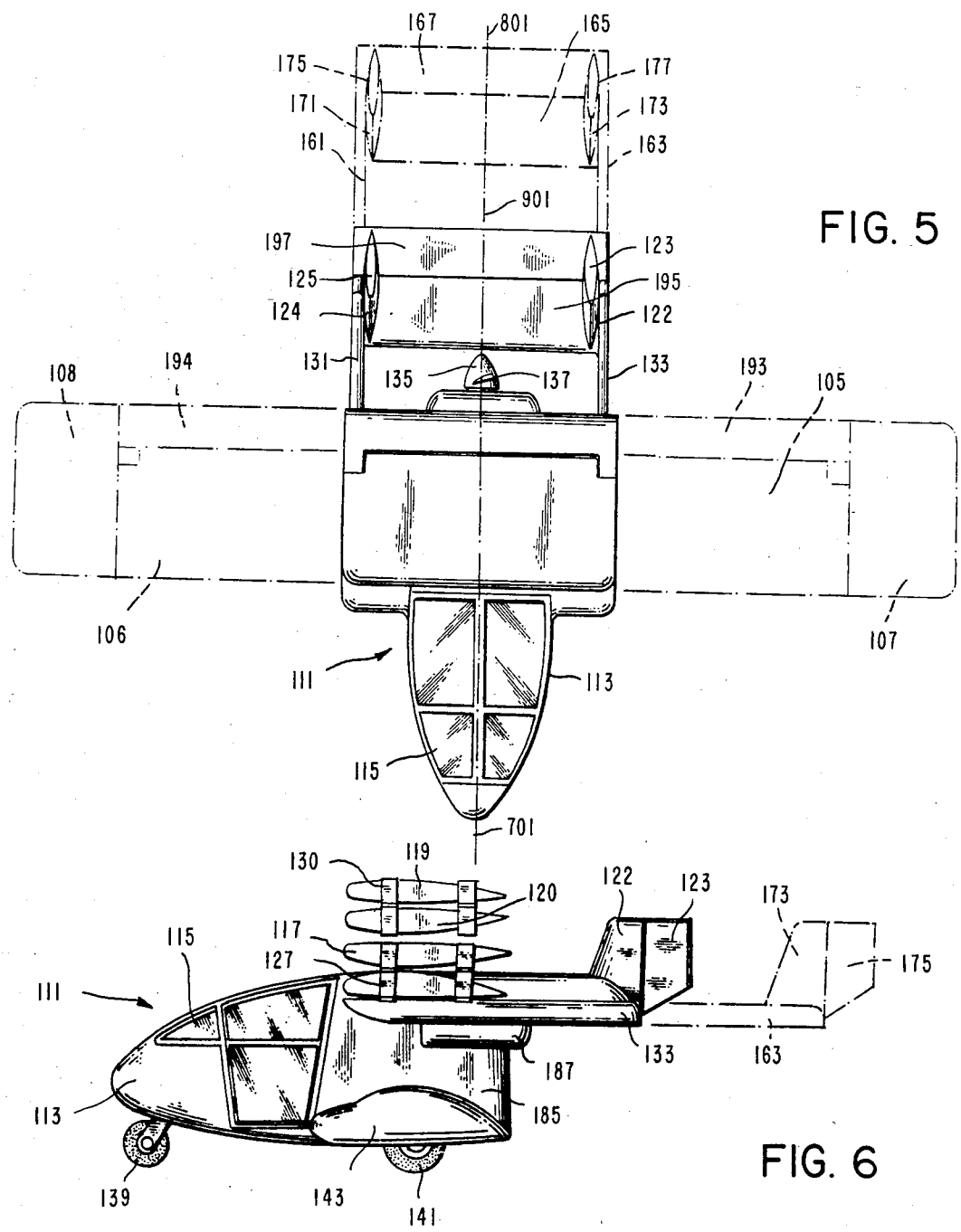
FIG. 5
FIG. 6

PUSHER TYPE AUTO-PLANE

BACKGROUND OF THE INVENTION

1. Field of the Invention

The present invention is directed to an improved combination road vehicle and aircraft, sometimes referred to as an "auto-plane". More specifically, the present invention is directed to an auto-plane designed to overcome the complexities inherent in the prior art auto-planes, and it is thus directed to a Pusher type auto-plane utilizing a revolutionary method of wing storage which optimizes functionality while minimizing storage requirements. The present invention uniquely achieves lightweight aircraft design while obtaining desirable fold up width for convenient road use.

2. Prior Art Statement

Many auto-planes have been designed and patented over recent decades but seem to have complex structures which are incapable of quick and convenient conversion from plane to road vehicle and vice versa.

U.S. Pat. No. 4,358,072 to Roger Williamson describes a land vehicle and aircraft combination which has separate engines for the land vehicle and the aircraft. This particular prior art invention involves a land vehicle which physically separates from an aircraft fuselage. While this allows a pilot to "fly" his auto, it requires complicated folding stock for aircraft controls, fuselage tilting or jacking, airport storage area for the fuselage which must be left behind and return to the point of landing for further flying. All of these shortcomings are overcome by the present invention.

U.S. Pat. No. 4,269,374 to Harvey Miller is directed to an auto-plane which, broadly stated, has the basic functionality of an auto-plane which has wing and tail structures that are movable outwardly for flying and inwardly for storage and road vehicle use. All of the parts remain intact in both the road and the flying forms. However, unlike the present invention, the Miller device has complicated fold away wheels; has wings that fold away in a complicated and complex fashion, namely, the front wings must be rotated about a fixed line 90° angle from horizontal surface to vertical surface, and also be swung into the side of the vehicle 90°, and must be folded in half along their lengths, requiring rotatability, lengthwise foldability and upward swivelability; and has a tailpiece and tail wing that must not only slide forward but also downward. This prior art auto-plane is very complex and, while it embodies the basics of wing hingeability, locking pins and folding mechanisms, it illustrates vividly what an auto-plane should not be if it is to be convenient, practical, cost effective and safely flyable.

U.S. Pat. No. 4,165,846 to Theodore Groeger teaches a land-air-water vehicle having doors which open to become wings and a large diameter set of tires which acts to assist in both land and water propulsion. Unwindable fins are used for control.

U.S. Pat. No. 3,614,024 to Victor Millman describes a combined watercraft and aircraft, showing wings which fold up so that the aircraft can rest on a remotely controlled watercraft. The watercraft is controlled by the pilot as a tow means until flying velocity and altitude are achieved, at which time the tow rope is "unreeled" and the aircraft is flown as a glider.

U.S. Pat. No. 3,612,440 to Richard Strong illustrates a warp action spoiler plate aileron in a combined airplane and automobile. This prior art auto-plane shows wings which swing 90° back into the body of the vehicle. Unfortunately, the folded wings must overlap one another in their storage slot and so must move up or down as they are swung in so as to render one partially over the other.

U.S. Pat. No. 3,371,886 to Robert Schertz teaches an auto-plane wherein each wing is twice hinged and the outer portion folds 180° over and flat with an inner portion, and then both the inner and outer portions as a single entity are folded upwardly 90° against one of two vertical stabilizers (twin tails). Unfortunately, unlike the present invention, these twice folded stored vertical wing portions render the auto-plane very top heavy. Further, they create the need for significantly more hardware, hinges, locking mechanisms, in fact, twice the amount needed with the preferred embodiment of the present invention, and create a four-wing thick top clearance problem.

U.S. Pat. No. 3,138,351 to Daniel Zuck describes an auto-plane wherein the wings swing back up so as to partially rest upon one another. Not only are complex wing movements required, but also the wing support struts are cut and hinged so as to break and swing inwardly in an awkward and broken path. This invention requires substantial, complex fold up hardware typical of the prior art.

U.S. Pat. No. 3,065,927 to Walter Mills illustrates an auto-plane with a top propeller (single prop gyrocopter) and wings which fold in. Each wing has two break points and two sets of hinges, again requiring more hardware and weight than the present invention.

U.S. Pat. No. 2,940,688 to Edward Bland teaches an aircraft adaptable for road vehicle use and for sailing as a sailboat. The wings rotate 90° up and are secured to the roof when the invention is used as a sailboat. When used as a road vehicle the wings rotate 90° up and then twist 90° to overlap one another and then drop back 90° to lay atop the vehicle. The tail has dual rudders and elevators, one of each on a telescoping tubular member. Unfortunately, storage of the wings for road use requires a complex series of three different motions and the necessary hardware, hinges and latches to achieve these.

Sometime prior to July, 1966, John Dyke of Dyke Aircraft, Fairborn, Ohio, developed the Dyke Aircraft JD-2 Delta, an experimental aircraft of low wing delta configuration with a tractor (front) engine and propeller. The aircraft has outer wing sections which can be folded over the top of the cabin with one wing section folded over the opposite wing section. This was not designed for operation of the aircraft after folding and did not involve an auto-plane. The purpose of the design was for storage and trailering. It was not designed for land use or water use. Lastly, this prior art, as well as the citations above, do not teach a Pusher type auto-plane design of the present invention.

Thus, notwithstanding formidable prior art, the simple, functional, convenient Pusher type auto-plane of the present invention has neither been taught nor rendered obvious.

SUMMARY OF THE INVENTION

An improved auto-plane has been invented which has been adapted for air travel and road travel using a Pusher type design. The present invention auto-plane has the Pusher propeller arrangement within the periphery of the rear stabilzer wing, toward the trailing point of the fuselage. The two main (front) wings are cut approximately parallel to an imaginary fuselage centerline at about two-thirds the distance in from the wing's outer tip to the imaginary centerline, one of the two wings being hinged along its cut at its top surface and the second of the two wings being hinged along its cut and above its top surface at a height sufficient to allow both of the two wings to be folded inward 180° with one resting atop the other. In an alternative embodiment, a unique double folding wing arrangement is used whereby the resulting stacking is only three wing segments thick. Wheels are located on the underside of the fuselage, e.g. in an aviation tricycle relationship, and aviation controls are located within the fuselage to control the aviation engine, propeller, elevator, rudders, etc. An independent land vehicle engine is located within the fuselage and connected to drive one or more of the wheels for land use.

BRIEF DESCRIPTION OF THE DRAWINGS

FIG. 1 with its dotted lines shows a front view of one embodiment of the present invention with the wings opened for flight;

FIG. 4 shows a front view of another embodiment of the present invention wherein the main wings are shown closed in a unique double stacking arrangement for land use and are shown open in dotted lines for air use;

FIG. 5 shows a top view of the present invention embodiment shown in FIG. 4; and, FIG. 6 shows a left side view of the present invention embodiment shown in FIGS. 3 and 4 with the rear stabilizer wings compacted and the main wings closed for land use.

DETAILED DESCRIPTION OF THE INVENTION

Figure 1:
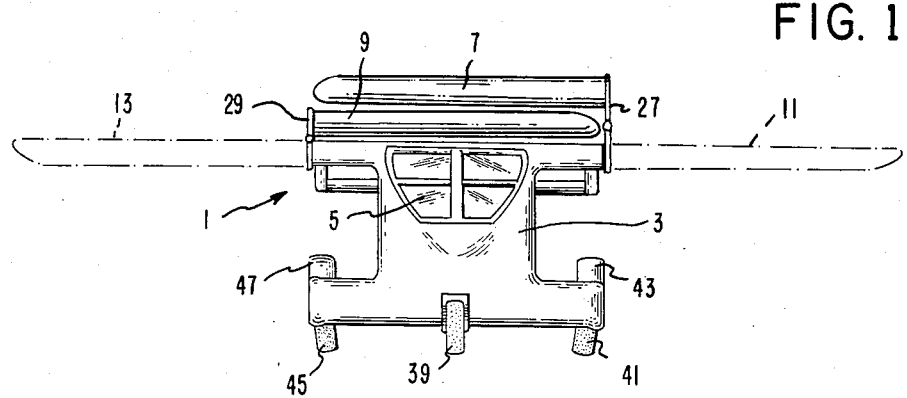
FIG. 1 shows a front view of one embodiment of the present invention with the main wings shown folded in for land use.

FIG. 1 shows a front view of a preferred embodiment of the present invention with the embodiment presented for air use shown partially with dotted lines and for road use totally in solid lines. Pusher type auto-plane shown as 1 has a fuselage 3 with windshield 5. Left main wing 7 and right main wing 9 are shown in solid lines in their folded positions. Wings 7 and 9 are connected to the fuselage and located towards the center of the fuselage and in an upwards position.

Hinges 27 and 29 respectively allow wings 7 and 9 to be folded as shown. Dotted line open wings 11 and 13 are cut and hinged as shown such that the right main wing 7 rotates 180° to rest atop right main wing 9. Note that hinge 27 extends above the top of the wing surface at a height sufficient to allow it to rotate upwards in a resting position above and thus atop the right main wing 9.

Also shown in FIG. 1 is the basic landing equipment. Fuselage 3 has a typical aviation landing arrangement for landing, namely, a tricycle having front wheel 39 and rear wheels 41 and 45. Main wheel enclosures 43 and 47 are airfoil contoured which with short connecting airfoil sections to the fuselage provide additional lifting surfaces. These surfaces along with the fuselage are sometimes referred to as "lifting bodies."

Figure 2:
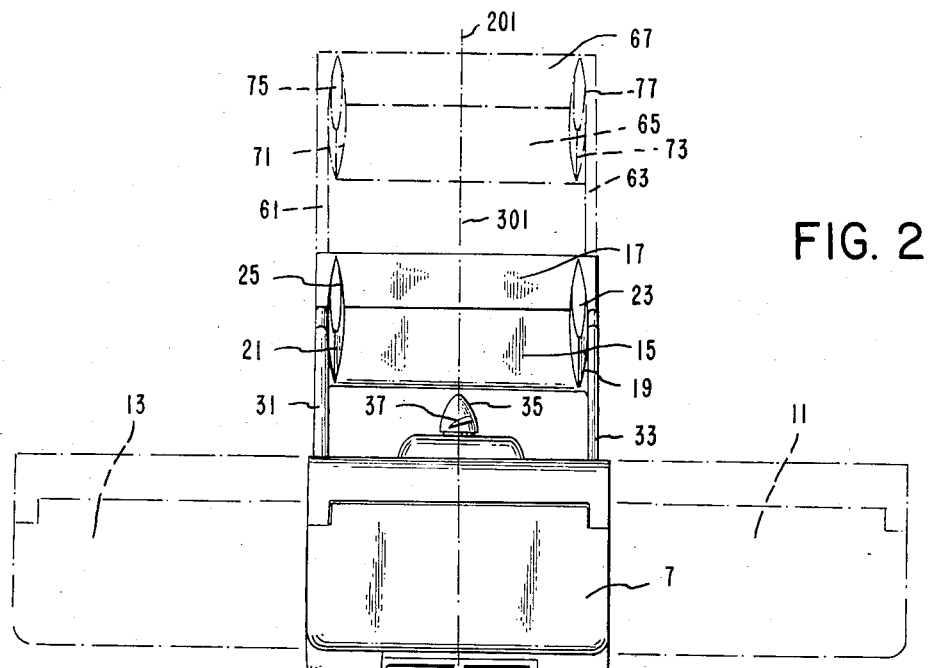
FIG. 2 shows a top view of the embodiment shown in FIG. 1 with the rear stabilizer wings compacted and the main wings shown closed for road use and with all wings shown with dotted lines for flight.

FIG. 2 shows a top view of Pusher type auto-plane 1 shown in FIG. 1, with like parts like numbered. Leading point 101 and trailing point 201 is shown on fuselage 3 as being connected by imaginary center line 301. Also, propeller hub 35 and propeller 37 are shown along center line 301. Main wings 7 and 9 are cut approximately parallel to imaginary center line 301 at a distance of about two-thirds the distance in from each wing's outer tip as measured to imaginary center line 301. This enables the auto-plane of the present invention to be optimally designed to allow for the widest wing span having the shortest folded spread while using only one cut and hinge line per wing. For example, open wings 11 and 13 may have a wing span of 21 feet. In this case, each wing is cut approximately 7 feet in from the tip, i.e., two-thirds of the 10½ foot distance from the tip to the imaginary center line. Further, in this case, the 21 foot wing span, when folded would have only a 7 foot spread. Similarly, for example, a 20 foot wing span in its folded position would have only a 6'4" spread. Also shown in FIG. 2 is a rear stabilizer 15 and elevator 17, and vertical stabilizers 19 and 21 with rudders 23 and 25, respectively. Telescoping fuselage segments 31 and 33 are shown and in conjunction with the periphery of horizontal stabilizer wing 15 encompass Pusher propeller 37 and hub 35. Extended telescoping segments 61 and 63 with horizontal stabilizer 65 and elevator 67, and vertical stabilizers 71 and 73 with rudders 75 and 77 are all shown in their flying position in dotted lines.

Figure 3:
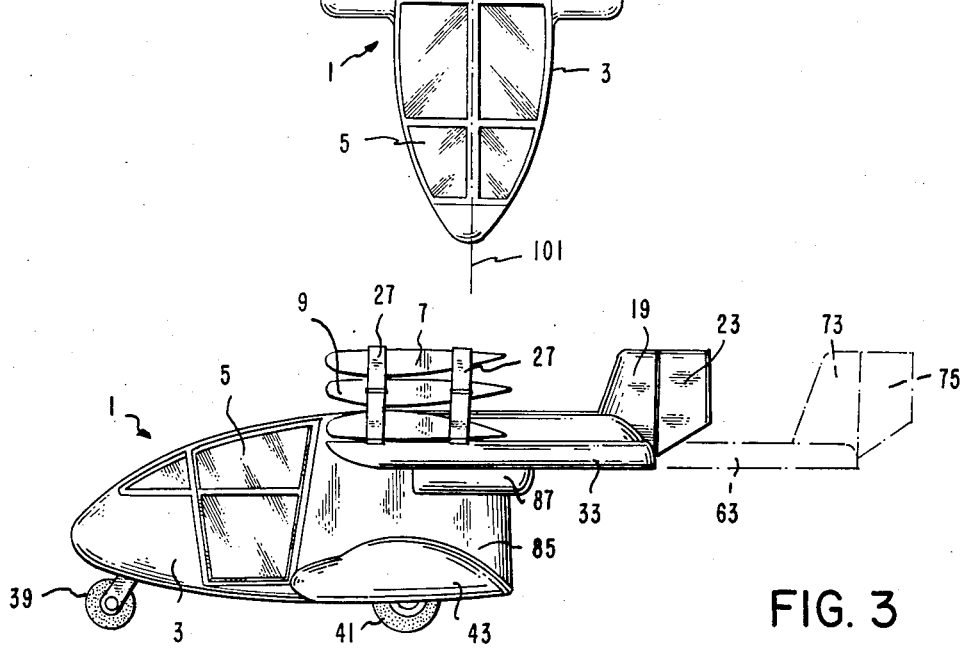
FIG. 3 is a left side view of the present invention embodiment shown in FIGS. 1 and 2.

FIG. 3 illustrates a side view of the Pusher type auto-plane 1 shown in FIGS. 1 and 2, with like parts like numbered. In this view, the cut side of left main wing 7 and the end of right main wing 9 are shown. Likewise, left vertical stabilizer 19 and rudder 23, telescoping segment 33 are shown in solid lines for land use and their dotted line counterparts for flying are likewise shown. Also, aviation engine housing 87 and land vehicle transmission and engine housing 85 are shown. The aviation engine contained within the housing 87 is connected to drive the propeller and does not function to drive the wheels 39, 41 and 45 for land use. Independently, the land vehicle transmission and engine located in housing 85 is connected to drive one or more of wheels 39, 41 and 45, preferably connected so as to drive rear wheels 41 and 45 for land use. As can be seen from side view FIG. 3, this embodiment could readily include seating for a pilot-driver and passenger in a tandem arrangement or in a two to four seat auto-plane with pilot-driver and one passenger in front seats and optional rear seats for one or two additional passengers.

FIGS. 4, 5 and 6 represent various views of an alternative embodiment of the present invention. Thus, FIG. 4 shows a front view of an embodiment of the present invention presented for air use shown partially with dotted lines, partially folded with dotted lines and for road use totally in solid lines. Pusher type auto-plane shown as 111 has a fuselage 113 with windshield 115. Left main wing 117 and tip segment 118 and right main wing 119 and tip segment 120 are shown in solid lines in their folded positions. Wings 117 and 119 (and their respective tip segments) are connected to the fuselage and located towards the center of the fuselage and in an upwards position.

Hinge pairs 127 and 128 and hinge pairs 129 and 130 respectively allow wings 117 and 119 and tip segments 118 and 120 to be double folded as shown. Dotted line open wings 105 and 106 are cut and double hinged so as to each have tip segments 107 and 108 respectively. As shown, left tip segment 107' rotates 180° downward (arrow A) and left main wing 105' rotates 180° upward to rest atop fuselage 113. Right tip segment 108' and 106' both rotate 180° upward and fold to rest atop the right main wing as shown. Note that hinge 129 extends above the top of the wing surface at a height sufficient to allow it to rotate upwards in a resting position above and thus atop the left main wing.

Also shown in FIG. 4 is the basic landing equipment. Fuselage 113 has a typical aviation landing arrangement for landing, namely, a tricycle having front wheel 139 and rear wheels 141 and 145. Main wheel enclosures 143 and 147 are airfoil contoured which with short connecting airfoil sections to the fuselage provide additional lifting surfaces. These surfaces along with the fuselage are sometimes referred to as "lifting bodies."

FIG. 5 shows a top view of Pusher type auto-plane 111 shown in FIG. 4, with like parts like numbered. Leading point 701 and trailing point 801 is shown on fuselage 113 as being connected by imaginary center line 901. Also, propeller hub 135 and propeller 137 are shown along center line 901. Main wings 117 and 119 are cut twice approximately parallel to imaginary center line 901 at a distance of about one-quarter the distance in from each wing's outer tip and again at a distance of about three-quarters that distance as measured to imaginary center line 901. This enables the auto-plane of the present invention to be optimally designed to allow for the widest wing span, the shortest folded spread, and the lowest overhead clearance while using only two cuts and hinge lines per wing. For example, the open wings may have a total wing span of 24 feet. In this case, each wing is cut approximately 3 feet in from the tip, i.e., one-fourth of the 12 foot distance from the tip to the imaginary center line, and again approximately 9 feet in from the tip, i.e., three-fourths of the distance in from the tip. Further, in this case, the 24 foot wing span, when folded would have only a 6 foot spread. Similarly, for example, a 28 foot wing span in its folded position would have only a 7 foot spread. Also shown in FIG. 5 is a rear stabilizer system, and more specifically, horizontal stabilizer 195 and elevator 197, and vertical stabilizers 122 and 124 with rudders 123 and 125, respectively. Telescoping fuselage segments 131 and 133 are shown and in conjunction with the periphery of horizontal stabilizer 195 encompass Pusher propeller 137 and hub 135. Extended telescoping segments 161 and 163 with horizontal stabilizer 165 and elevator 167, and vertical stabilizers 171 and 173 with rudders 175 and 177 are all shown in their flying position in dotted lines.

FIG. 6 illustrates a side view of the Pusher type auto-plane 1 shown in FIGS. 4 and 5, with like parts like numbered. In this side view, in addition to the parts already shown in conjunction with FIGS. 4 and 5, aviation engine housing 187, and land vehicle transmission and engine housing 185 are shown. The aviation engine contained within the housing 187 is connected to drive the propeller and does not function to drive the wheels 139, 141 and 145 for land use. Independently, the land vehicle transmission and engine located in housing 185 is connected to drive one or more wheels 139, 141 and 145, preferably connected so as to drive rear wheels 141 and 145 for land use. As can be seen from side view FIG. 6, this embodiment, as well as the embodiment of FIG. 3 above, could readily include seating for a pilot-driver and passenger in a tandem arrangement or in a two to four seat auto-plane with pilot-driver and one passenger in front seats and optional rear seats for one or two additional passengers.

Obviously, numerous modifications and variations of the present invention are possible in light of the above teachings. It is therefore to be understood that within the scope of the appended claims, the invention may be practiced otherwise than as specifically described herein.

What is claimed is:

1. In a Pusher type auto-plane for aircraft use and road vehicle use having both a Pusher aviation engine and an independent land vehicle engine, the improvement comprising:
   (a) a Pusher type aircraft fuselage having a leading point and a trailing point, and having an imaginary centerline from said leading point to said trailing point;
   (b) two main wings connected to said fuselage, each of said wings being cut twice approximately parallel to said imaginary centerline, once at about one-quarter and once at about three-quarters the distance in from the wing's outer tip to said imaginary centerline, so as to create a cut main wing and a segment tip for each of the two main wings, each of the two main wings being hinged at each of said two cuts, and, as to the cuts located at about three-quareters of the distance in from the wing's outer tip to said imaginary centerline, one of said two main wings being hinged along said cut at its top surface and the second of said two wings being hinged along said cut and above its top surface at a height at least one wing thickness above its top and at a height sufficient to allow both of said two wings to be folded inward 180° with one resting atop the other and with each of the segment tips being folded inwardly, one downward, and one upward, nesting between the two cut main wings in substantially the same horizontal plane;
   (c) a rear stabilizer system having a horizontal stabilizer and two vertical stabilizers, an elevator functionally connected to said horizontal stabilizer and rudders functionally connected to said vertical stabilizers, said system being substantially symmetrical to said imaginary centerline;
   (d) a Pusher propeller located at approximately the trailing point of said fuselage;
   (e) at least three wheels located on the underside of said fuselage in an aviation landing relationship, at least one of said wheels being connected to be driven by an independent land vehicle engine; and,
   (f) aviation controls located within said fuselage connectively related to a Pusher aviation engine, and said propeller, elevator and rudders.

2. The auto-plane of claim 1 wherein said fuselage includes seating for a pilot-driver and at least one passenger.

3. The auto-plane of claim 1 wherein there are three wheels located on the underside of said fuselage in an aviation landing tricycle relationship.

4. The auto-plane of claim 1 wherein said rear stabilizer system telescopes in for land use and telescopes out for aviation.

5. In a Pusher type auto-plane for aircraft (111) use and road vehicle use having both a Pusher aviation engine and an independent land vehicle engine, the improvement comprising:

(a) a Pusher type aircraft fuselage (113) having a leading point (701) and a trailing point (801), and having an imaginary centerline (901) from said leading point (701) to said trailing point (801);

(b) two main wings (105) and (106) connected to said fuselage (113), each of said wings (105) and (106) being cut twice approximately parallel to said imaginary centerline (901), once at about one-quarter and once at about three-quarters the distance in from the wing's outer tip to said imaginary centerline (901), so as to create a cut main wing (117) and (119) and a segment tip (107) and (108) for each of the two main wings (105) and (106), each of said two main wings (105) and (106) being hinged at each of said cuts, one of said two cut main wings (117) being hinged (127) along said cut at its top surface and the second of said two cut main wings (119) being hinged (129) along said cut and above its top surface at a height sufficient to allow both of said two cut main wings (117) and (119) to be folded inward 180° with one resting atop the other and with each of the segment tips (118) and (120) resting between the two cut main wings (117) and (119) in substantially the same horizontal plane;

(c) a rear stabilizer system having a horizontal stabilizer (195) and two vertical stabilizers (122) and (124), an elevator (167) functionally connected to said horizontal stabilizer (195) and rudders (123) and (125) functionally connected to said vertical stabilizers (122) and (124), said system being substantially symmetrical to said imaginary centerline (901);

(d) a Pusher propeller (137) located at approximately the trailing point (801) of said fuselage (113);

(e) at least three wheels (139), (141), and (145) located on the underside of said fuselage (113) in an aviation landing relationship, at least one of said wheels being connected to be driven by an independent land vehicle engine; and, (f) aviation controls located within said fuselage connectively related to a Pusher aviation engine, and said propeller, elevator and rudders.

6. The auto-plane of claim 5 wherein said fuselage includes seating for a pilot-driver and at least one passenger.

7. The auto-plane of claim 5 wherein there are three wheels (139), (141) and (145) located on the underside of said fuselage (113) in an aviation landing tricycle relationship.

8. The auto-plane of claim 5 wherein said rear stabilizer system telescopes in for land use and telescopes out for aviation.

* * * * *